May 11, 1965     E. E. HIEBER     3,182,569
SEAL AND STRUCTURE FOR SUPPORTING THE SAME
Filed Nov. 28, 1960
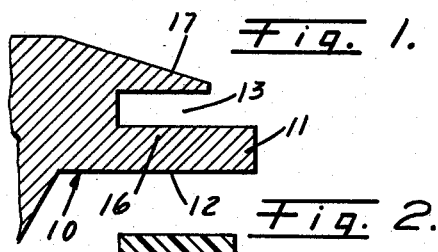
Ellsworth E. Hieber,
INVENTOR.
WHANN & McMANIGAL
Attorneys for Applicant
by 3,182,569
SEAL AND STRUCTURE FOR SUPPORTING
THE SAME
Ellsworth E. Hieber, Glendale, Calif., assignor to Schulz Tool and Manufacturing Co., San Gabriel, Calif., a corporation of California
Filed Nov. 28, 1960, Ser. No. 71,954
5 Claims. (Cl. 92—243)

This invention relates to sealing structures and, more particularly, to an elastomer type seal secured in a metal supporting structure by means integral with the latter.

Elastomer type seals made from materials, such as polytetrafluoroethylene, sold commercially as "Teflon," are used under extreme temperatures and contract when the temperatures are lowered so as to move away from the sealed surface. To overcome this difficulty in the prior art, retainers for the seals were tightly secured to the supporting member so as to compress the sealing material between the retainer and the support. In order to compensate for this compression and to permit compressive growth of the portion between the retainer and the support, an axially extending annular groove having an internal diameter substantially equal to that of the sealing member, was provided in the retainer. While these retainer grooves serve to compensate for the compression of the sealing member under the retainer, the groove itself is an additional requirement in the manufacture of a sealing structure so as to considerably add to the cost.

It has been found that the amount of contraction of Teflon, for example, is directly proportional to its volume and that the Teflon being held directly under a typical retaining flange forms a part of the volume which contracts. Thus, a large portion of the sealing member, not adjacent the sealed surface, is effective to increase the movement of the sealing member away from the latter a considerable amount in excess of what it would be if only the part of the seal outwardly of the retainer were subject to contraction. That is, the contraction of a typically retained Teflon seal is analogous to that of the contraction of fluid from the tube section into the bulb section of a thermometer.

It is therefore an object of the present invention to provide a means in and a method for making a sealing structure having an elastomeric sealing material to reduce the amount of contractible elastomer. In other words, in accordance with the present invention, the volume of a given piece of elastomer sealing material in a sealing structure available to be contracted away from the sealed surface has been greatly reduced.

It is another object of the present invention to provide an improved means and method for securing elastomeric sealing material in a metal supporting member.

It is still another object of the present invention to provide a sealing structure in which the elastomer sealing material is secured therein with the maximum compressive holding force as close as possible to the sealing surface. The result of this in an elastomer ring is that the volume of the sealing material which is subjected to shrinkage is very small in comparison to its diameter and thus, by reducing the volume subjected to shrinkage, the movement of the seal away from the surface being sealed is reduced.

It is a further object of the invention to provide a sealing support member that is integral with the sealing material retaining means.

It is a still further object of the invention to provide a sealing structure in which an elastomeric sealing member is secured in a one-piece metal support member so as to make an effective sealing means under extreme conditions of high-low temperature operation, such as experienced in high speed aircraft and missiles in which cryogenic fluids are used.

It is another object of the invention to provide an improved sealing structure for applications involving flat-face type mating surfaces, tapered seat mating surfaces, radial mating surfaces and combinations thereof.

It is still another object of the invention to provide a means and method for making a sealing structure in which the requirement for a separable retainer is eliminated.

It is a further object of the invention to provide a means and method for making a sealing structure in which a compression compensation means in the retaining means is eliminated.

Further objects and advantages of the invention may be brought out in the following part of the specification wherein small details have been described for competence of disclosure, without intending to limit the scope of the invention which is set forth in the appended claims.

Referring to the accompanying drawings, which are for illustrative purposes only:

FIG. 1 is a fragmentary cross-sectional view of a circular support member and retaining member having an annular groove therebetween adapted to receive an annular elastomeric sealing member;

FIG. 2 is a fragmentary cross-sectional view of an annular elastomer seal;

FIG. 3 is a cross-sectional view of the sealing support shown in FIG. 1 with the annular seal inserted in the annular groove;

FIG. 4 is a view of the sealing structure after the seal has been secured therein;

FIG. 5 is a fragmentary view of a completed sealing structure after the exposed part of the elastomeric material has been made concentric with the sealing structure;

FIG. 6 is a fragmentary cross-sectional view of an annular sealing support and integral retaining means having an annular groove with its outer wall surface at an obtuse angle to its base;

FIG. 7 is an illustration of a face-type annular seal according to the present invention;

FIG. 8 is a fragmentary cross-sectional view of an annular seal on a tapered sealing surface;

FIG. 9 is a view of a radial-type seal according to the present invention, and having a cylindrical sealing surface;

FIG. 10 is a cross-sectional view of an annular radial-face type seal; and

FIG. 11 is a transverse sectional view showing a piston in a cylinder and having two oppositely directed elastomeric sealing cups, one of which is secured to the piston and the other of which is loosely fitted in its groove and not yet secured.

Referring again to the drawings, there is illustrated in FIGS. 1–5 the steps by which an annular sealing structure, according to the present invention, may be made. Such a structure can be formed, for example, on a poppet valve which is adapted to seat on a tapered sealing surface.

In FIG. 1 an annular seal support member, generally designated as 10, is shown comprised of a leading end surface 11 extending radially outwardly of a central recess portion having a cylindrical surface 12. Outwardly of the surface 12 is an annular, generally rectangular groove 13 between rectangular wall portion 16 and tapered wall portion 17.

In FIG. 2 is shown an annular sealing ring or member 18 of elastomeric material, such as polytetrafluoroethylene, and having an internal diameter such as to permit its installation into groove 13, as shown in FIG. 3, without exceeding its elastic limit.

After the seal ring 18 is inserted into the annular groove 13, the annular support member 10 may be rotated or spun about its central axis and frusto-conical outer surface 19 may be deformed by holding a rod thereon to force end portion 22 into the body of the sealing member so as to compress it at 23, forming a shoulder 24 in the sealing member in the form 18a, as shown in FIG. 4. The result of this step is to positively and permanently fix the sealing member in place in the support member by means of the retaining wall 17a, integral with the latter. The same result may also be obtained by swaging or pressing the end 22 of wall 17a into its position as shown.

In securing the sealing member in the support member, cylindrical surface 25 in FIG. 4, extending outwardly of the end 22, may be somewhat deformed because of the nature of the elastomeric material. If the latter is the case, it may be remedied by machining the surface 25 and thus reducing the diameter of the portion of the sealing member extending axially outwardly of the wall 17a to form a new cylindrical surface 28 on the finished sealing member 18b.

As may be clearly seen in FIG. 5, the sealing member is greatly compressed adjacent the sealing surface at point 23 where the greatest holding force is applied. This results in substantially limiting the effective shrinkable portion of the sealing member to that part axially outwardly of point 23 and radially inwardly of surface 28. Thus, the volume of the shrinkable portion is greatly reduced as compared with the entire volume of the seal, and because the amount of shrinkage is directly proportionate to the volume, the movement of the seal away from the surface being sealed is proportionally reduced to provide better sealing.

It should be further noted that the sealing contact on the surface being sealed will be made in this particular embodiment on the outer corner of the surface 28 and that the shoulder 24 directly axially inwardly therefrom is in abutment with the end 22 of the wall so as to restrain the movement of the elastomeric material away from the surface being sealed.

In FIG. 6 a fragmentary portion of a sealed support member 29 is shown having an annular groove 30. Here the groove has one annular surface 31 perpendicular to the groove face 32 and has its other annular surface 34 at an obtuse angle with the base. The purpose of the latter is to provide an easier means of inserting the sealing member into the groove.

In FIG. 7 another form of a sealing structure 35, according to the invention, is illustrated. The seal is of the face type and may be static or may be on a poppet valve where the sealing structure 35 forms the poppet and the sealing member 36 therein is moved toward and away from the sealed surface 37. As in FIG. 5, the wall 40 of the sealing structure has been displaced radially inwardly, the greatest displacement being adjacent its end 41, which has moved inwardly into the body of the sealing member so as to compress it, forming a shoulder 42 in contact with the end 41. Again, the sealing member is held by the integral retaining means in the sealing support with the greatest compressive force near the sealing surface so as to effectively reduce the amount of available shrinkable volume of the sealing member.

In FIG. 8, another type of tapered seal is shown in which the sealing support structure 46 has a radially or transversely directed groove inwardly of its circumferential surface 48. Here again, the wall surface 49 outwardly of the groove is compressed or swaged inwardly to form the shoulder 52 in the sealing member 53.

In FIG. 9 a radial type seal is illustrated in which the sealing support member 54 is typically a piston adapted to reciprocate in a cylinder 55 on its internal cylindrical surface 58. In this type of arrangement the sealing member 59 is secured in place, having the greatest compressive holding force along the circumferential surface of the piston which is very close to the sealing surface.

In FIG. 10 the seal shown is similar to that in FIG. 5 except that the sealing member 60 extends longitudinally beyond the sealing support member 61. The sealing member thus has two sealing surfaces, one being on the axially directed face 64 and the other being on the radially directed or circumferential face 65.

In FIG. 11 there is shown a piston 66 adapted for reciprocation in cylinder 67. The piston 66 has a central enlarged diameter portion 69 and two axially opposite outer small diameter portions 70 and 71. Two radially directed grooves 72 and 75 extend inwardly from the circumferential surfaces of walls 70 and 71 respectively, the grooves having one of their faces in alignment with the radially directed faces of the enlarged diameter portion 69.

The seals 76 and 77 are of the annular oppositely directed cup type, having their outer edges in sealing engagement with the wall of the cylinder 67. The seal 76 is shown to be loosely fitted in the groove 72 and is adapted to be secured therein by swaging wall 70 axially inwardly to compressively contact the sealing member to complete the sealing structure in the same manner as wall 71 is fixedly holding sealing member 77 in groove 75.

As indicated, the outer edges of the sealing members are biased against the wall of the cylinder so that there is a natural force to hold the sealing member in sealing contact. In addition, when the piston is moved to the right in the drawing by fluid pressure on the left, the fluid moving the piston forces the seal 77 into sealing contact with the wall of the cylinder, and the enlarged diameter portion 69 of the piston serves as a back-up for the sealing member so as to hold it in its proper sealing contact. Where there is no pressure on one side of the piston, on the right in the present example, the sealing member, such as 76, functions as a wiper, and the enlarged diameter portion 69 holds it in proper wiping position on the wall of the cylinder.

While various embodiments of the invention have been described illustrating the advantages of having an integral sealing supporting member and retaining means for the seal and of having the maximum gripping of the sealing member occurring as close as possible to the sealing surface so as to reduce the volume of the seal available for contraction, it is clear that the principles disclosed herein may be employed in other types of unshown sealing structures without departing from the invention.

I claim:

1. A sealing structure comprising: a circular support member; an elastomeric sealing member disposed in an annular groove integral with said support member; means integral with said support member fixedly and compressively securing said sealing member in said groove, said groove having a greater depth than width; and a portion of said sealing member extending outwardly of said groove, a greater volume of said sealing member being within said groove than outwardly thereof, said last portion having a shoulder formed by the compression of said last means and being in overlapping abutting relationship with said means securing said sealing member, said last means in said abutting relationship serving to restrain the sealing member from moving away from a sealing contact on a surface being sealed at extremely low temperatures.

2. A sealing structure comprising: a circular support member; an elastomeric annular sealing member disposed in an annular groove integral with said support member and adjacent an end thereof, said groove having a greater depth than width, said sealing member having a sealing contact portion outwardly of said groove; an integral portion of said support member defining an outer surface of said groove snugly and compressingly securing said sealing member therein adjacent said sealing contact portion; and a second outer portion of said sealing member inwardly of said sealing contact portion extending outwardly of said groove, said second outer portion having a shoulder in abutting overlapping relationship with a portion of an outer end of said integral portion of said support member defining said outer groove surface, said shoulder being formed in the deformation of said sealing member by said compression by said integral portion, said second outer portion of said sealing member having a surface extending outwardly from said shoulder substantially within the limits defined by an outer imaginary extension of said groove and within the limits defined by an imaginary outer extension of the overlapped portion of said outer end of said integral portion and terminating outwardly at said sealing contact portion of said sealing member.

3. A sealing structure comprising: a circular support member; an annular sealing member disposed in an annular groove integral with said support member and adjacent an end thereof, said sealing member having a sealing contact portion extending outwardly of said groove; an axially directed integral portion of said support member defining an outer surface of said groove snugly and compressingly securing said sealing member therein adjacent said sealing contact portion, said groove having a greater depth than width; a second outer portion of said sealing member being annular and being inwardly of said sealing contact portion extending outwardly of said groove, said second outer portion having a radial shoulder in abutting overlapping relationship with an outer end of said integral portion of said support member defining said outer groove surface, said shoulder being formed in the deformation of said sealing member by said compression by said integral portion; and an outer cylindrical surface of said sealing member being concentric with said support member, said last surface extending axially outwardly from said shoulder and being of larger diameter than said outer groove surface at said outer end of said integral portion.

4. A sealing structure for use in extreme temperatures, comprising: a circular support member adapted to be moved in an axial path; an annular elastomeric sealing member disposed in an annular groove integral with said support member, said groove having a greater depth than width, said sealing member having an outer portion thereof extending outwardly of said groove and outwardly of a surface of said support member, said outer portion of said sealing member having a sealing contact portion; and an annular integral wall portion of said support member defining an outer surface of said groove and securing said sealing member therein, said wall portion adjacent its outer end being in a compression relationship with said sealing member so as to deform the latter inwardly within said groove, the portion of said sealing member outwardly of said groove having a shoulder formed by said compression, said shoulder being in abutting overlapping relationship with a portion of said outer end of said wall portion, said portion of said sealing member outwardly of said groove having a surface extending outwardly from said shoulder substantially within the limits defined by an imaginary outer extension of said groove and within the limits defined by an imaginary outer extension of the overlapped portion of said wall end, said last surface terminating outwardly at said sealing contact portion of said sealing member, the volume of said sealing member outwardly of the groove being substantially less than the volume thereof within the groove.

5. A sealing structure for use in extreme temperatures, comprising: a circular support member; an annular polytetrafluoroethylene sealing member disposed in an annular groove integral with said support member, said sealing member having a portion thereof extending outwardly of said groove and outwardly of a surface of said support member, said outer portion of said sealing member having a sealing contact portion; an integral wall portion of said support member defining an outer surface of said groove and fixedly and snugly securing said sealing member therein, said wall portion in juxtaposition to its outer end being in a compression relationship with said sealing member in juxtaposition to its sealing contact portion and so as to deform the sealing member inwardly within said groove; and an outer surface of said sealing member being substantially within the limits defined by an outer imaginary extension of said groove and terminating outwardly in said sealing contact portion, said outer surface terminating inwardly in a shoulder on said outer portion of said sealing member, said shoulder being formed by said compression relationship and being in an abutting overlapping relationship with a portion of said outer end of said wall portion, said outer surface of said sealing member being within the limits defined by an imaginary outer extension of the overlapped portion of said wall end, the length of the sealing member outwardly of the groove being substantially less than the length thereof within the groove.

References Cited by the Examiner

UNITED STATES PATENTS

| 1,715,944 | 6/29 | Oliner | 286—26.4 X |
| 1,888,843 | 11/32 | Anderson | 29—509 |
| 1,950,223 | 3/34 | Budd | 29—509 |
| 2,026,409 | 12/35 | Wheeler | 286—26.4 |
| 2,139,387 | 12/38 | Schweiss | 309—52 |
| 2,326,355 | 8/43 | Halstead | 286—26.4 |
| 2,509,461 | 5/50 | Ulseth | 277—95 X |
| 2,677,581 | 5/54 | Taylor | 309—52 |
| 2,718,444 | 9/55 | Harris | 309—52 |
| 2,772,931 | 12/56 | Biedermann | 92—243 |
| 2,853,347 | 9/58 | Cooper | 309—52 |
| 2,970,871 | 2/61 | Flick | 309—52 |
| 3,021,822 | 2/62 | Rumsey | 92—125 |

FOREIGN PATENTS

| 894,453 | 3/44 | France. |
| 1,187,293 | 3/59 | France. |
| 661,160 | 6/38 | Germany. |
| 369,086 | 3/32 | Great Britain. |
| 790,795 | 2/58 | Great Britain. |

FRED E. ENGELTHALER, *Primary Examiner.*

MORRIS FRITZ, SAMUEL B. ROTHBERG, SAMUEL LEVINE, *Examiners.*